(12) United States Patent
Xie et al.

(10) Patent No.: US 9,317,481 B2
(45) Date of Patent: Apr. 19, 2016

(54) DATA ACCESS METHOD AND DEVICE FOR PARALLEL FFT COMPUTATION

(75) Inventors: Shaolin Xie, Beijing (CN); Donglin Wang, Beijing (CN); Xiao Lin, Beijing (CN); Jie Hao, Beijing (CN); Xiaojun Xue, Beijing (CN); Tao Wang, Beijing (CN); Leizu Yin, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 260 days.

(21) Appl. No.: 14/117,375

(22) PCT Filed: Dec. 31, 2011

(86) PCT No.: PCT/CN2011/085139
§ 371 (c)(1),
(2), (4) Date: Nov. 13, 2013

(87) PCT Pub. No.: WO2013/097219
PCT Pub. Date: Jul. 4, 2013

(65) Prior Publication Data
US 2014/0337401 A1    Nov. 13, 2014

(51) Int. Cl.
*G06F 17/14* (2006.01)

(52) U.S. Cl.
CPC .................................... *G06F 17/142* (2013.01)

(58) Field of Classification Search
None
See application file for complete search history.

(56) References Cited

U.S. PATENT DOCUMENTS

| 679,441 A | 7/1901 | Vinton |
| 6,304,887 B1 | 10/2001 | Ju et al. |
| 2004/0015530 A1* | 1/2004 | Kang ............... G06F 17/142 708/404 |
| 2005/0058059 A1* | 3/2005 | Amer ............... G06F 17/142 370/210 |
| 2006/0224651 A1* | 10/2006 | Madhavapeddi ..... G06F 17/142 708/404 |

(Continued)

FOREIGN PATENT DOCUMENTS

| CN | 1504890 A | 6/2004 |
| CN | 101339546 A | 1/2009 |

(Continued)

OTHER PUBLICATIONS

International Search Report for corresponding International Application No. PCT/CN2011/085139, mailed Nov. 1, 2012 (2 pages).

(Continued)

*Primary Examiner* — David H Malzahn
(74) *Attorney, Agent, or Firm* — Osha Liang LLP (57) ABSTRACT

A data access method and device for parallel FFT computation. In the method, FFT data and twiddle factors are stored in multi-granularity parallel memories, and divided into groups throughout the computation flow according to a uniform butterfly representation. Each group of data involves multiple butterflies that support parallel computation. Meanwhile, according to the butterfly representation, it is convenient to generate data address and twiddle factor coefficient address for each group. With different R/W granularities, it is possible to read/write data and corresponding twiddle factors in parallel from the multi-granularity memories. The method and device further provide data access devices for parallel FFT computation. In the method and device, no conflict will occur during read/write operations of memories, and no extract step is required for sorting the read/written data. Further, the method and device can flexibly define the parallel granularity according to particular applications.

10 Claims, 6 Drawing Sheets

(56) References Cited

U.S. PATENT DOCUMENTS

| | | | |
|---|---|---|---|
| 2008/0256159 A1* | 10/2008 | Schwoerer | G06F 17/142 708/404 |
| 2010/0179978 A1* | 7/2010 | Halvarsson | G06F 17/142 708/404 |
| 2011/0099216 A1* | 4/2011 | Sun | G06F 17/142 708/404 |
| 2011/0153706 A1* | 6/2011 | Yancey | G06F 17/142 708/404 |
| 2014/0089369 A1* | 3/2014 | Wang | G06F 17/142 708/404 |
| 2014/0089370 A1* | 3/2014 | Xie | G06F 17/142 708/409 |
| 2014/0330880 A1* | 11/2014 | Wang | G06F 17/142 708/404 |
| 2014/0337401 A1* | 11/2014 | Xie | G06F 17/142 708/404 |

FOREIGN PATENT DOCUMENTS

| | | |
|---|---|---|
| CN | 101571849 A | 11/2009 |
| CN | 102411491 A | 4/2012 |

OTHER PUBLICATIONS

Written Opinion for corresponding International Application No. PCT/CN2011/085139, mailed Nov. 1, 2012 (4 pages).

\* cited by examiner

| Computation Node | Computation Stage | Butterfly Data Index (600) | Twiddle factor Exponent (601) |
|---|---|---|---|
| 0 | 0 | $g_3g_2g_1g_0b_0b_?$ | 00000 |
| 0 | 1 | $g_3g_2g_1g_0b_?b_0$ | $b_00000$ |
| 1 | 0 | $g_3g_2b_0b_?g_1g_0$ | $g_1g_0000$ |
| 1 | 1 | $g_3g_2b_?b_0g_1g_0$ | $b_0g_1g_000$ |
| 2 | 0 | $b_0b_?g_3g_2g_1g_0$ | $g_3g_2g_1g_00$ |
| 2 | 1 | $b_?b_0g_3g_2g_1g_0$ | $b_0g_3g_2g_1g_0$ |

DATA ACCESS METHOD AND DEVICE FOR PARALLEL FFT COMPUTATION

CROSS-REFERENCE TO RELATED APPLICATIONS

This is a national stage application based on PCT/CN2011/085139, filed on Dec. 31, 2011. This application claims the priority from the same, and hereby incorporates the same by reference in its entirety.

TECHNICAL FIELD

The present application relates to data access technology, and in particular to data access methods and devices for parallel FFT computation.

BACKGROUND

Signal processing systems are typically required to convert signals between time and frequency domains. The Fast Fourier Transform (FFT) algorithm enables such signal conversion between time and frequency domains. Compared with other transform algorithms, FFT has advantages of uniform structure and less computation, and thus has been widely used in signal processing systems.

Figure 1:
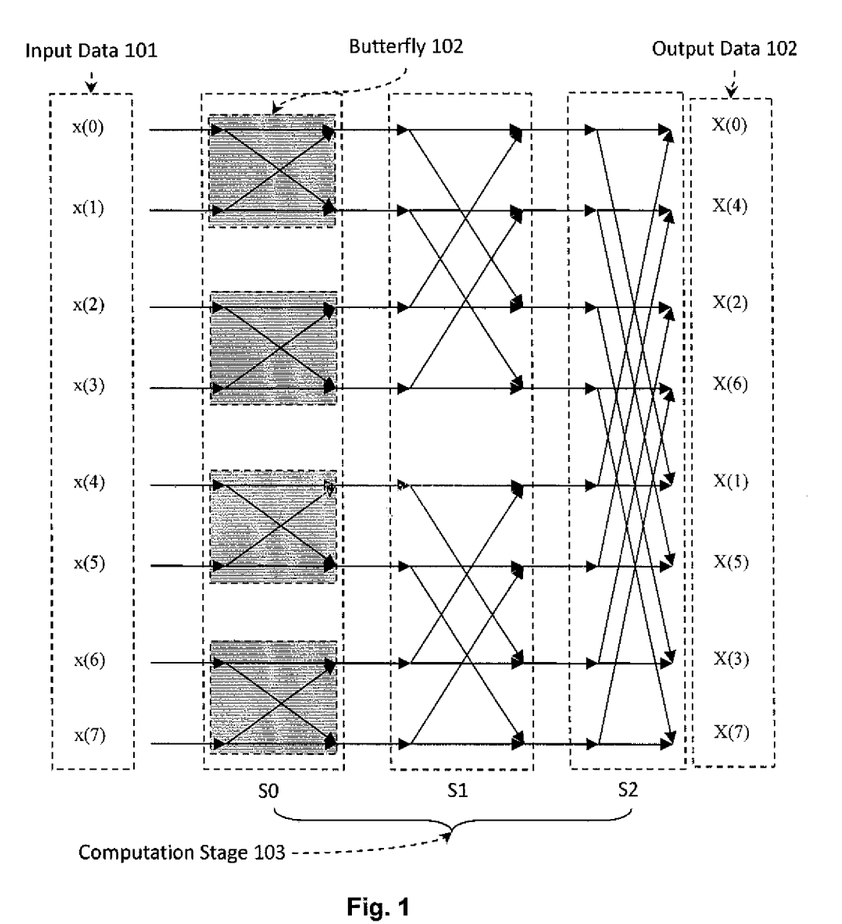
FIG. 1 is a flowchart of a radix-2 FFT algorithm with temporal decimation when the data length is 8.

FFT takes N points of data as input and outputs N pieces of data. In general, a transform from time to frequency domain is called forward transform, while a transform from frequency to time domain is called inverse transform. There are many approaches for implementing FFT, and they are all evolved from the Cooley-Tukey algorithm. The radix-2 Cooley-Tukey algorithm has $\log_2 N$ computation stages for N data points. Each computation stage takes N data points and outputs N data points. The output from the previous stage is sorted in certain manner and used as input to the next stage. The input to the first stage is original data, and the output from the last stage is the result of FFT computation. FIG. 1 shows a computation flow including three computation stages 103 (S0, S1, S2) by assuming that the length of the data points is 8.

Figure 2:
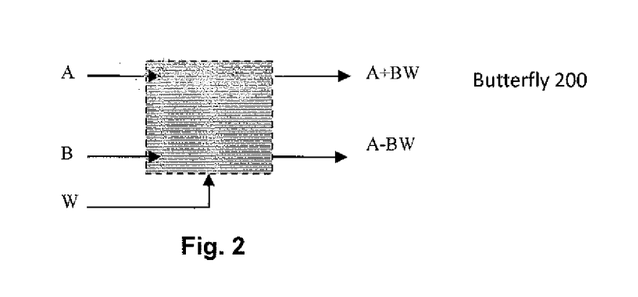
FIG. 2 is a schematic diagram of a butterfly.

Each computation stage 103 is formed by N/2 butterflies 102, of which the computation flow is shown in FIG. 2. Each butterfly 102 takes two data points A and B and a twiddle factor W as input, and obtains two results A+BW and A−BW after butterfly computation. In the computation of each butterfly, the indices of the input data A and B has a correspondence which is determined by the computation stage of the butterfly, and the indices of the input data A or B. Meanwhile, the value of the twiddle factor W is determined by the computation stage 103 of the butterfly, and the indices of the input data A or B, and the data length of FFT. In the computation stage S0 of FIG. 1, the first data and the zeroth data form a butterfly, the zeroth data is the input A to the butterfly, and the first data is the input B to the butterfly. The value of W is 1. In the computation stage S1, the first data and the third data form a butterfly, the first data is the input A of the butterfly, the third data is the input B of the butterfly, and the value of W is 1.

The computation stages are data-dependent, and the next stage can only start its computation until the computation of the previous stage is completed. Accordingly, after completing the computation, each stage stores the results in a memory, and the next stage reads from the memory the computation results of the previous stage as input. The butterflies in a computation stage are independent of each other, and the order of the butterflies computation does not affect the results.

However, the data A, B and the twiddle factor W read out by each butterfly must satisfy certain internal correspondence.

Most of patent documents related to parallel FFT computation, such as U.S. Pat. No. 6,792,441B2 ("Parallel Multi-Processing For Fast Fourier Transform With Pipeline Architecture"), focus on how to decompose a long sequence of FFT data into a plurality of short sequences of FFT data, use a plurality of processors to compute the respective short sequences of FFT data in parallel, and then interleave the short sequences of FFT results to obtain a final long sequence of FFT result. Such algorithms do not consider possible conflict when the plurality of processors access the memory at the same time, or how the processors interleave the short sequences of FFT results. In practical applications, the conflict in memory access and synchronization and communication efficiency among the processors will greatly affect FFT computation efficiency. The U.S. Pat. No. 6,304,887B1 ("FFT-Based Parallel System For Array Processing With Low Latency") discusses parallel read/write of data in FFT. According to the patent document, the FFT data are stored in a plurality of memories, and sorted by using multiple data buffers and multiple selectors, in order to guarantee that for each R/W operation, data are distributed in a different memory. In this way, it is possible to achieve parallel read/write of data. In the patent document, dedicated memories, data buffers and selectors are required, and calculation of R/W addresses is complex. Thus, it is difficult to implement parallel FFT computation with different data lengths and R/W granularities.

SUMMARY

In view of the above problems, the present disclosure provides data access methods and devices for parallel FFT computation.

The present disclosure provides a data access method for parallel FFT computation comprising:

step 1, dividing initial FFT data of a length N into $2^G$ groups by a parallel granularity $2^B$, where $G=\log_2 N - B$, and storing the $2^G$ groups in respective memory rows 805 of $2^B$ memory blocks 804 in a multi-granularity parallel memory 300 or 302, where each of the memory blocks 804 comprises $2^{G-B}$ groups, and occupies $2^{G-B}$ memory rows 805;

step 2, storing sequentially $2^B - 1$ twiddle factors required for computation of each butterfly group 402 in memory rows of a multi-granularity parallel memory 303;

step 3, reading data required for FFT butterfly computation stored in the jth memory row 805 of the ith memory block 804 in the multi-granularity parallel memory 300 or 302 with a read granularity of $2^B$, where i and j each have an initial value of 0, and reading sequentially, from the multi-granularity parallel memory 303, the twiddle factors required for FFT butterfly computation with a granularity of $2^B$ in the order of the memory rows;

step 4, performing parallel butterfly computation on the data read from the jth memory row 805 with a granularity of $2^B$ based on the read twiddle factors;

step 5, writing the result data of butterfly computation to the multi-granularity parallel memory 300 or 302 with a granularity of 1, where when the data was read from the memory 300 at step 3, the result data is written to the memory 302 in step 5, and vice versa;

step 6, determining whether an index j of the current memory row satisfies $j < 2^{G-B}$ and incrementing j by 1 and returning to step 3 if it satisfies, otherwise setting j to 0 and proceeding to step 7;

step 7, determining whether an index i of the current memory block satisfies i<$2^B$, and incrementing i by 1 and returning to step 3 if it satisfies, otherwise terminating the method.

Another aspect of the present disclosure provides a data access device for parallel FFT computation comprising multi-granularity parallel memories 300 and 302, a multi-granularity parallel memory 303, and a butterfly computation module 301, wherein The multi-granularity parallel memories 300 and 302 is arranged as a ping-pang configuration to alternately store input data or output data of a computation stage 401;

The multi-granularity parallel memory 303 is configured to store twiddle factors for the computation stage 401;

The butterfly computation module 301 is configured to perform butterfly computation on to-be-processed data alternately acquired from the multi-granularity parallel memories 300 and 302 based on the twiddle factors stored in the multi-granularity parallel memory 303, and alternately store the computation results in the multi-granularity parallel memories 300 and 302;

Connection lines between the multi-granularity parallel memory 300 and the butterfly computation module 301 comprise data lines 306, an address line 310, and an access granularity indication line 309;

Connection lines between the multi-granularity parallel memory 302 and the butterfly computation module 301 comprise data lines 305, an address line 312, and an access granularity indication line 311;

Connection lines between the multi-granularity parallel memory 303 and the butterfly computation module 301 comprise data lines 304, an address line 308, and an access granularity indication line 307;

Wherein if the data for butterfly computation are read from the multi-granularity parallel memory 300, the result data of the computation are written to the multi-granularity parallel memory 302, and vice versa.

According to the present disclosure. FFT data and twiddle factors are stored in multi-granularity parallel memories, and divided into groups throughout the computation flow according to a uniform butterfly representation. Each group of data involves multiple butterflies that support parallel computation. Meanwhile, according to the butterfly representation, it is convenient to generate data address and twiddle factor coefficient address for each group. With different RAN granularities, it is possible to read/write data and corresponding twiddle factors in parallel from the multi-granularity memories. No conflict will occur during read/write operations of memories, and no extract step is required for sorting the read/written data. Further, the present disclosure can flexibly define the parallel granularity according to particular applications.

DETAILED DESCRIPTION OF THE EMBODIMENTS

In the following, the present disclosure will be further explained with reference to the figures and specific embodiments so that the objects, solutions and advantages of the present disclosure become more apparent.

Figure 3:
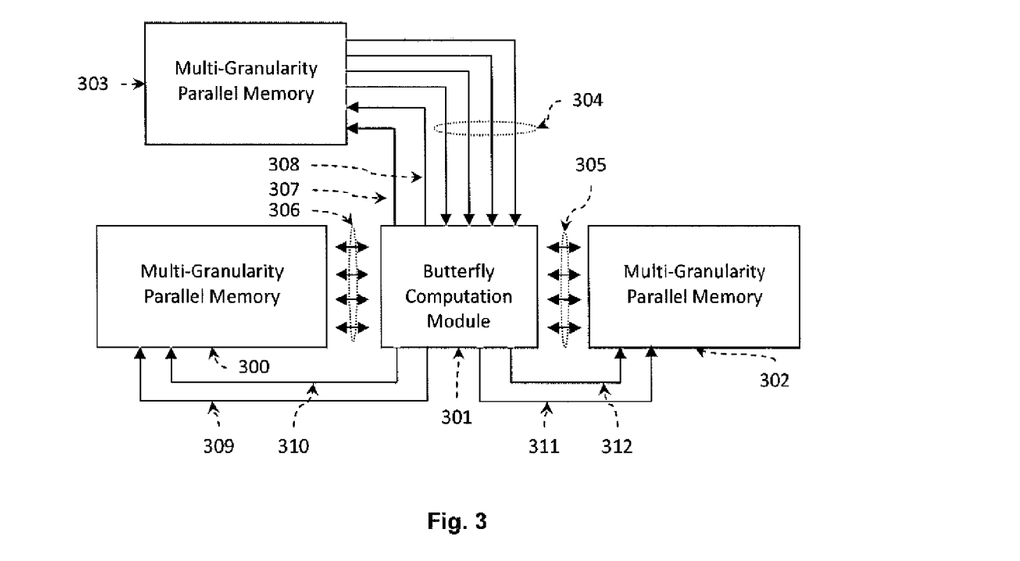
FIG. 3 is a block diagram of a data access device for parallel FFT computation according to the present disclosure.
Figure 4:
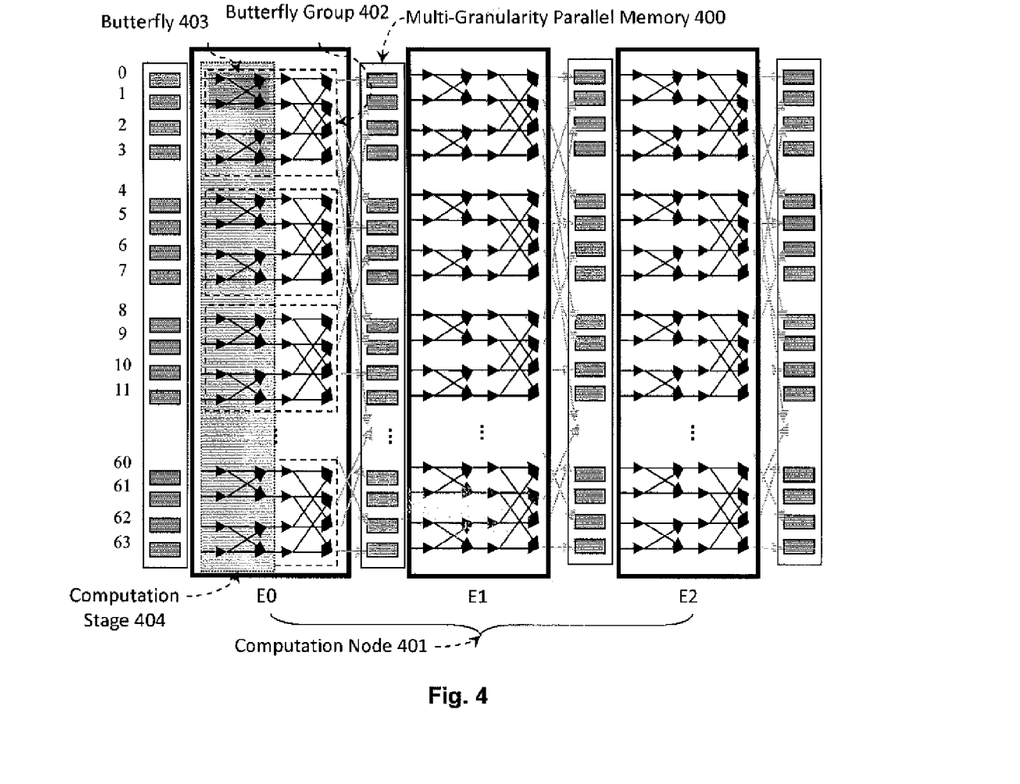
FIG. 4 is a schematic diagram showing a butterfly, a butterfly group, a computation stage and a computation node according to the present disclosure.

In parallel FFT computation, a computation module reads data and respective twiddle factors for multiple butterflies from a multi-granularity parallel memory, performs a plurality of multi-stage butterfly computations in parallel, and then writes computation results in parallel into the memory for use in the next stage, as shown in FIG. 4. Here, assuming that the data length is 64, and parallel granularity is 4, that is, the multi-granularity parallel memory 400 support reading/writing 4 points of data each time. Meanwhile, 4 data-dependent butterflies 403 in two adjacent stages form a butterfly group 402, and the butterfly groups in the two adjacent stages form a computation node 401. The butterfly computation module 301 reads data points and twiddle factors required for one butterfly group in parallel from the memory 300 or 302, and the memory 303, respectively, and writes computation results in parallel into the memory 300 or 302 after completing the computation of the butterfly group, as shown in FIG. 3.

In the butterfly group 402, the input A, B and W to each butterfly must satisfy the internal correspondence. Therefore, in the parallel FFT computation, consideration must be made as to the distribution of data and twiddle factors in the memory, and read/write (R/W) addresses and R/W schemes for each butterfly group 402, in order to guarantee that the butterfly computation module can always read desired data and twiddle factors in parallel.

In the description, symbols are defined as follows:
N: data length for FFT; it must be a power of 2;
B: bit width of parallel granularity, i.e., $2^B$ denotes parallel granularity;
G: bit width of index value of a butterfly group, G=$\log_2 N$−B;
g: index value of a butterfly group;
b: an intra-group index value of the data.

To achieve parallel FFT read/write and computation, a parallel granularity $2^B$ (B is a positive integer) is initially defined, and the parallel granularity represents the number of data points that can be read in parallel from a memory and can be used independently for butterfly computation. As shown in FIG. 4, assuming that the FFT data length is N=64, and the parallel granularity is $2^2$. Then, the 64 data points are divided into 16 groups for parallel processing. Each of the groups includes 4 data points, and can be used independently in two stages of radix-2 FFT computation. Each stage includes two butterflies 403. When the parallel granularity is $2^B$, each group can be used independently in B stages of radix-2 FFT computation, and each stage includes ($2^B$)/2 radix-2 butterflies. Therefore, upon reading a group, the butterfly computation module can perform B×($2^B$)/2=B×$2^{B-1}$ butterfly computations independently, and then write the computation results to the multi-granularity parallel memory 400.

For FFT data of a length N, $\log_2 N$ bits are required for representing an index value of each data point. After dividing into groups by the granularity $2^B$, each of the N data points has its index value decomposed into two portions: a group index value and an intra-group index. For the N data points, there are in total $N/2^B$ groups, and $\log_2(N/2^B)=\log_2 N - B$ bits are required to represent the group index values. Given the definition $G=\log_2 N - B$, the group index values may be denoted as $g=g_{G-1} \ldots g_1 g_0$. Meanwhile, each group includes $2^B$ data points, and B bits are required to represent the intra-group index values. Here, the intra-group index values may be denoted as $b=b_{B-1} \ldots b_1 b_0$. Prior to starting the FFT computation, the index value of each data point may be denoted as:

Data Index Value=$g \times 2^B + b = (g<<B) + b =$
$(g_{G-1} \ldots g_1 g_0 b_{B-1} \ldots b_1 b_0)$ The $2^B$ data points within a group may form $2^B/2=2^{B-1}$ butterflies according to certain internal correspondence for FFT computation. Therefore, the index value of each butterfly needs to be represented by B−1 bits. According to the present disclosure, the data are grouped so that only one bit is different for the intra-group index values of two data points inputted to a butterfly computation. Here, this different bit is denoted by "$b_?$." It is prescribed that when the bit "$b_?$" has a value of 0, the corresponding data point represents input A of the butterfly computation; when the bit "$b_?$" has a value of 1, the corresponding data point represents input B of the butterfly computation. Then, the intra-group index value for a butterfly may be denoted as $b=b_{B-2} \ldots b_? \ldots b_1 b_0$. The bit "$b_?$" may be located at any position within the binary representation of the intra-group index value. The difference in position represents a "butterfly stride" for every butterfly in each computation stage, i.e., a difference between the index values of two input data points in the butterfly. For example, when the bit "$b_?$" is located at the kth bit of the intra-group index value, all butterflies in the stage have a butterfly stride of $2^K$.

Butterfly stride=B' Index−A' Index=$(b_{B-2} \ldots 1 b_{k-1} \ldots b_1 b_0) - (b_{B-2} \ldots 0 b_{k-1} \ldots b_1 b_0) = 2^k$ FIG. 4 depicts data grouping and a parallel FFT computation flow. In the figure, assuming that the FFT data length is N=64, and the parallel granularity is $2^2$. Upon dividing data into groups in the parallel granularity of $2^B$, each group can be used independently to perform $B \times (2^B)/2$ 2-based butterfly computations. The $B \times 2^{B-1}$ butterflies are referred to as a butterfly group 402, and all butterfly groups available for parallel computation form a computation node 401. The computation nodes have the same butterfly structure formed of a plurality of butterfly groups 402 in a vertical direction and a plurality of computation stages 404 in a horizontal direction. The overall FFT computation flow consists of a plurality of computation nodes 401, which read data from the multi-granularity parallel memory 400, pass the data through a plurality of computation stages 404, and write the computation results to the multi-granularity parallel memory 400.

Figure 5:
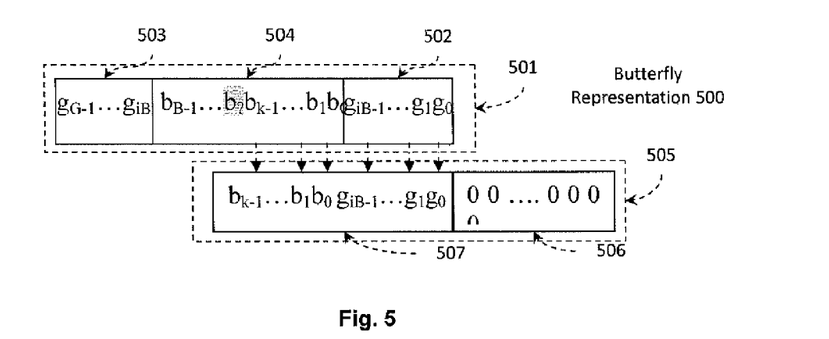
FIG. 5 is a schematic diagram showing composition of a butterfly representation.

For different computation stages, the relative locations of the group index g and the intra-group index b may change. The present disclosure controls the R/W address and the R/W granularity for the butterfly groups in each computation node, so that the index of data for some butterfly in the kth computation stage of the ith computation node and the index of the corresponding twiddle factor can be expressed collectively as the butterfly representation 500 shown in FIG. 5. In FIG. 5, the butterfly representation 500 is divided into two portions. The first portion 501 is used to represent bits of the index values of two input data points for some butterfly computation, and the second portion 502 is used to represent bits of the index of the twiddle factor corresponding to the butterfly computation. A total of N/2 twiddle factors are required for FFT data of a length N. The value of each twiddle factor may be represented as $e^{-(j2\pi/N)T}$ ($0 \leq T < N/2$). Accordingly, the value of the twiddle factor can be fully decided by T which is called as exponent of the twiddle factor. The index value 501 of the input data may also be viewed as two portions: group index value 502, 503, and intra-group index value 504. 502 refers to lower part of the group index value, and the lower part has a total of iB bits in a representation for the ith computation node. 503 refers to higher part of the group index value excluding the lower part 502. Again, the intra-group index value 504 has B bits. For the butterfly at the kth computation stage of the ith computation node, the flag "$b_?$" is located at the kth bit of the intra-group index value 504.

The exponent of the twiddle factor corresponding to the butterfly of the representation 501 may have a binary representation 505 in FIG. 5. The representation 505 has G+B−1 bits consisting of two portions: bits 507 and bits 506. The bits 507 are k+iB bits on the right of the "$b_?$" in the index value 501, and the bits 506 consist of G+(1−i)B−1−k bits "0."

Figure 6:
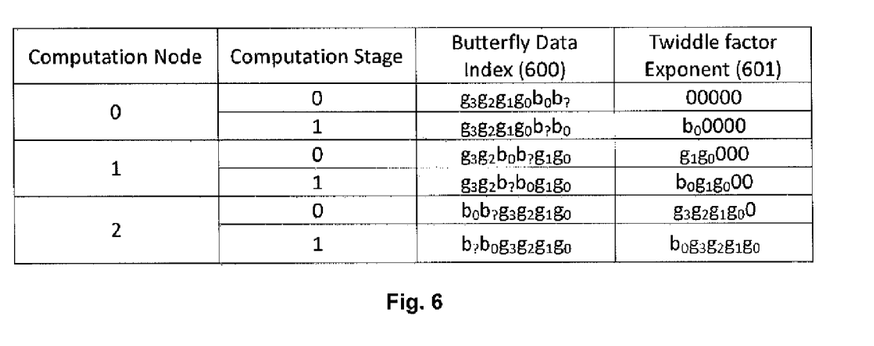
FIG. 6 is a schematic diagram showing butterfly representations of respective computation nodes and stages with a parallel granularity of 4 and a data length of 64.

FIG. 6 shows butterfly representations of respective computation nodes and stages when N=64, and B=2.

FIG. 1 shows a flowchart of the Cooley-Tukey algorithm with decimation in time. In the flowchart, the butterfly stride of the butterflies in the ith computation stage 103 is $2^i$. To allow each butterfly group 402 to perform computation independently, data must be decimated from the initial data sequence by a butterfly stride at the time of data grouping. In the present disclosure, data decimation of various butterfly strides may be implemented by using multi-granularity parallel memories.

Figure 8:
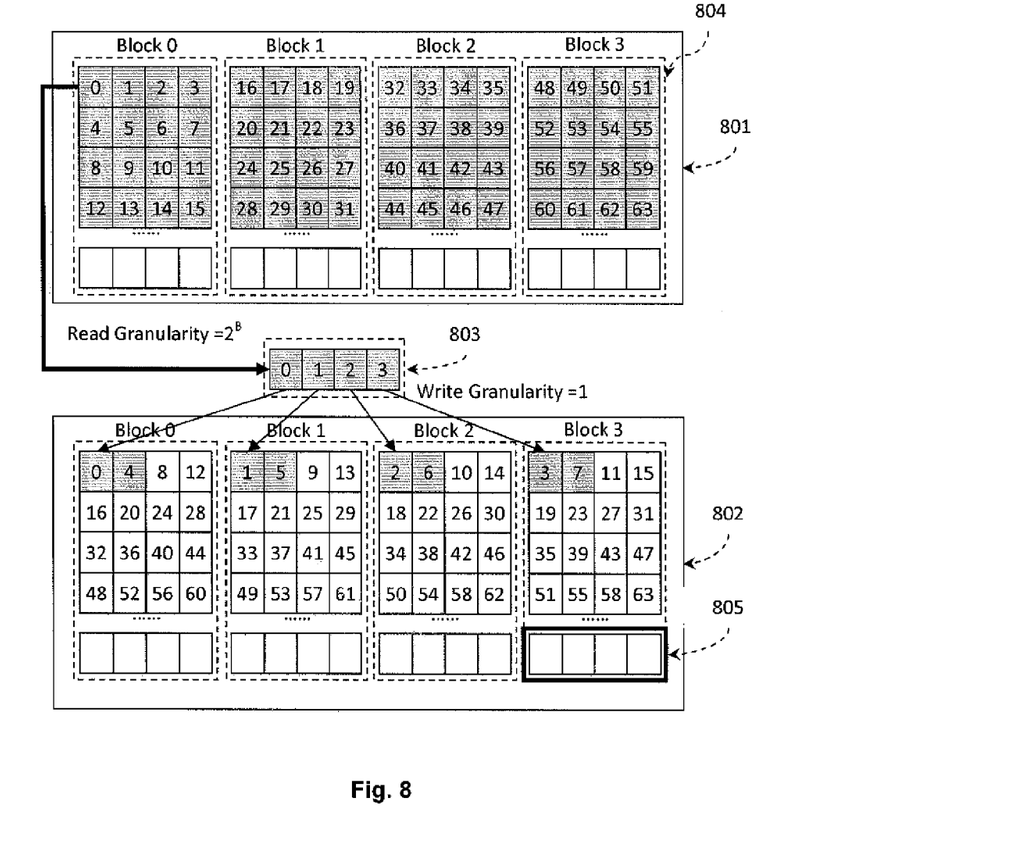
FIG. 8 is a schematic diagram showing a distribution of 64 FFT data points in memories and the read/write scheme of a computation node according to the present disclosure.

The data storage method of the present disclosure is shown in FIG. 8, assuming N=64, and B=2. In the figure, the digital numbers denote index values of FFT data, the multi-granularity parallel memories 801 and 802 may be the multi-granularity parallel memories 300 and 301 of FIG. 3, respectively. There may be $2^B$ memory blocks 804 within the multi-granularity parallel memory 901 when the parallel granularity is $2^B$. Here, the FFT data of a length N is divided into $2^G$ groups which are stored sequentially in the $2^B$ memory blocks 804. One of the memory rows 805 in each memory block corresponds to data for one butterfly group.

Figure 9:
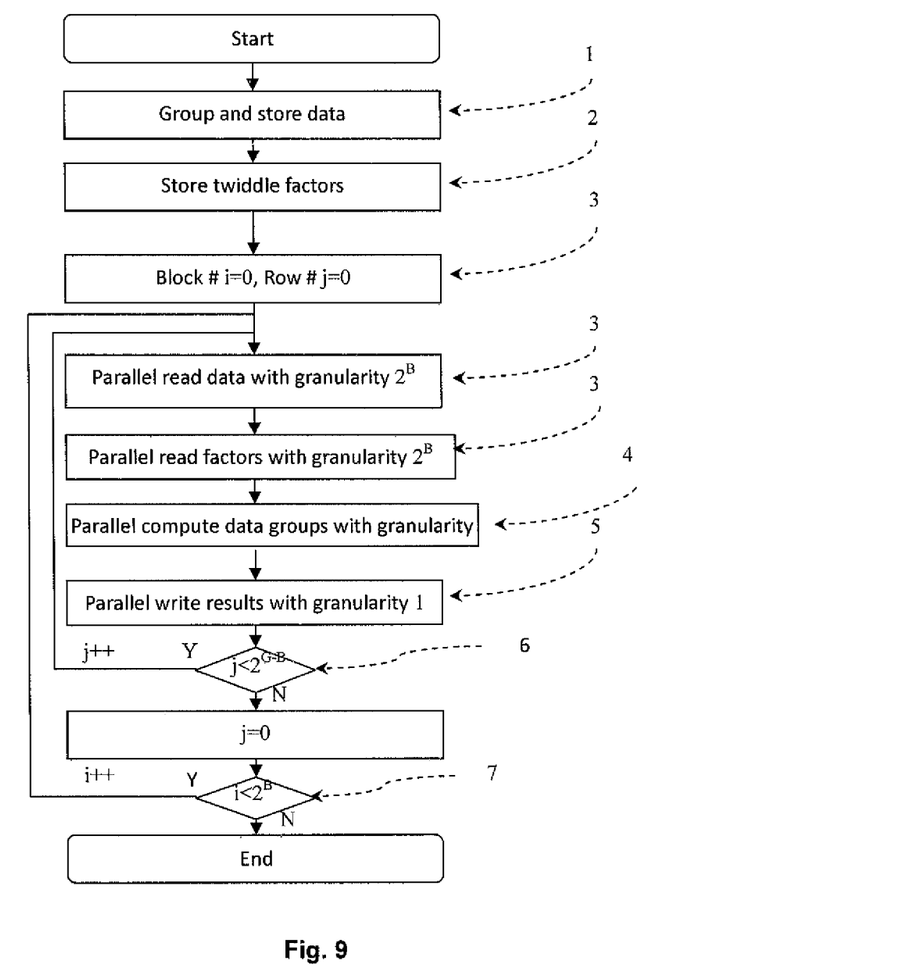
FIG. 9 is a flowchart of a data access method of a computation node in parallel FFT computation.

FIG. 9 shows a flowchart of a data access method at a computation node. Here, according to the steps shown in FIG. 9, the method of the present disclosure stores initial FFT data to a multi-granularity parallel memory, and sequentially reads data in respective memory rows 805 of memory blocks 804 in the memory. As shown in FIG. 9, the data access method for parallel FFT butterfly computation of the present disclosure includes the following steps.

Step 1, dividing initial FFT data of a length N into $2^G$ groups by a parallel granularity $2^B$, where $G=\log_2 N - B$, and storing the $2^G$ groups in respective memory rows 805 of $2^B$ memory blocks 804 in the multi-granularity parallel memory 300 or 302, where each of the memory blocks 804 comprises $2^{G-B}$ groups, and occupies $2^{G-B}$ memory rows 805.

For FFT data of a length N, there are a total of $2^G$ groups when the parallel granularity is $2^B$.

Step 2, storing sequentially $2^B - 1$ twiddle factors required for computation of each butterfly group 402 in memory rows of the multi-granularity parallel memory 303.

The exponent of the twiddle factor corresponding to the butterfly 403 at the kth computation stage 404 of the ith computation node 401 is $T=(b_{k-1} \ldots b_1 b_0 g_{iB-1} \ldots g_1 g_0 0 \ldots 0)$, $0 \leq k \leq B-1$, as denoted by 505 of FIG. 5. For a butterfly group 402, $g_{iB-1} \ldots g_1 g_0$ in 507 is fixed, while $b_{k-1} \ldots b_1 b_0$ changes. Accordingly, the kth computation stage of the butterfly group needs $2^k$ twiddle factors. The butterfly group has B computation stages, and thus the butterfly group as a whole needs $\Sigma_{k=0}^{B-1} 2^k = 2^B - 1$ twiddle factors.

Figure 7:
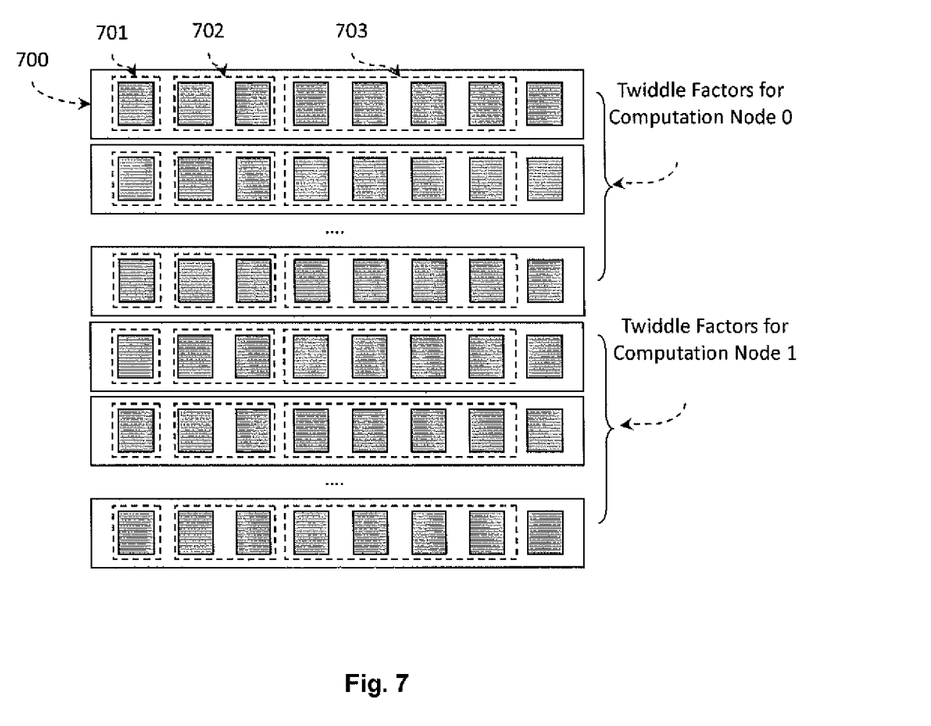
FIG. 7 is a schematic diagram showing how twiddle factors for a butterfly group are stored in memory rows when the parallel granularity is 8.

The R/W bit width of the multi-granularity parallel memory 303 is $2^B$ when the parallel granularity is $2^B$. Accordingly, twiddle factors for the respective computation stages 404 of the butterfly group 402 may be calculated in advance, and stored sequentially in one of the memory rows of the multi-granularity parallel memory 303. The twiddle factors for the butterfly group may be read in parallel with a granularity of $2^B$ during the computation. FIG. 7 shows how the twiddle factors for the respective computation stages 404 of the butterfly group 402 are stored in the memory row 700 when the parallel granularity is 8. 701 denotes a twiddle factor for the $1^{st}$ computation stage, 702 denotes two twiddle factors for the $2^{nd}$ computation stage, and 703 denotes four twiddle factors for the $3^{rd}$ computation stage.

Step 3, reading data required for FFT butterfly computation stored in the jth memory row 805 of the ith memory block 804 in the multi-granularity parallel memory 300 or 302 with a read granularity of $2^B$, where i and j each have an initial value of 0, and reading sequentially, from the multi-granularity parallel memory 303, the twiddle factors required for FFT butterfly computation with a granularity of $2^B$ in the order of the memory rows.

When reading data for butterfly computation, the read granularity is set as $2^B$, and data for FFT butterfly computation stored in the respective memory rows 805 of the memory blocks 804 in the multi-granularity parallel memory 300 are read sequentially. That is, the read operation starts with the zeroth memory row 805 of the zeroth memory block 804, then the first memory row 805 of the zeroth memory block 804, and so on, until all the memory rows 805 occupied by groups in the memory block 804 have been read. After the read operation of all the memory rows 805 occupied by groups in the zeroth memory block 804 is completed, the read operation continues with the memory rows 805 of the first memory block 804, until all the memory rows 805 occupied by groups in the memory block 804 have been read. The R/W address is determined by the index value i of the memory block 804 and the index value j of the memory row 805. The address for the jth memory row 805 of the ith memory block 804 is i×size of memory block+j×$2^B$.

The memory rows 805 from which the data for the FFT butterfly computation are read at step 3 are sorted, and a global index for each memory row is obtained as I=(i<<G)+j, where i denotes the index of the memory block 804, j denotes the index of the memory row 805, and i<<G denotes shifting i by G bits leftward. Correspondence between the global index I of the memory row and the number g of the butterfly group 402 in the butterfly representation 500 is related to the index of the computation node 401 as follows:

> When the kth computation node reads data, the butterfly group 402 corresponding to the memory row of a global index I, which is numbered as g(whose value is I circulately shifted by kB bits leftward)    (Formula 1)

The twiddle factors for FFT butterfly computation are read sequentially from the multi-granularity parallel memory 303 in the order of the memory rows with a granularity of $2^B$. Specifically, when reading the data for FFT butterfly computation at step 3, the global index I of the memory row may be obtained from the index i of the memory block 804 and the index j of the memory row. Then, the number g of the butterfly group 402 corresponding to the Ith memory row may be obtained from the index I according to Formula 1. The exponent 505 of the twiddle factor for the butterfly group 402 may be obtained from the number g by using the butterfly representation 500, and then the twiddle factor may be calculated for the butterfly group 402.

Prior to the FFT computation, the twiddle factors for each butterfly group 402 in each computation node 401 are sequentially stored in a memory row 700 of the memory, as shown in FIG. 7. When reading the data for the computation at step 3, the data stored in the memory row 700 may be sequentially read to obtain the twiddle factors for the butterfly group 402.

Step 4, performing parallel butterfly computation on the data read from the jth memory row 805 with a granularity of $2^B$ based on the read twiddle factors.

The butterfly computation is an in-place operation, that is, in FIG. 2 the index of the computation result A+BW in the output data must be the same as the index of A in the input data, and the index of the computation result A−BW in the output data must be the same as the index of B in the input data.

Step 5, writing the result data of butterfly computation to the multi-granularity parallel memory 300 or 302 with a granularity of 1, where when the data was read from the memory 300 at step 3, the result data is written to the memory 302 in step 5, and vice versa.

The write address is the index of the memory row plus an increment. For the jth memory row 805 of the ith memory block 804, the incremented index is i×N/$2^{2B}$+j.

Step 6, determining whether an index j of the current memory row satisfies j<$2^{G-B}$, and incrementing j by 1 and returning to step 3 if it satisfies, otherwise setting j to 0 and proceeding to step 7.

Step 7, determining whether an index i of the current memory block satisfies i<$2^B$, and incrementing i by 1 and returning to step 3 if it satisfies, otherwise terminating the method Each computation node 401 performs only one read/write operation. The multi-granularity parallel memories 801 and 802 form a ping-pong configuration. If the computation node 401 performs a read operation on the memory 801 at step 3 of FIG. 9, it will perform a write operation on the memory 802 at step 5, vice versa. If the computation node 401 writes the results to the memory 801, the next computation node will read the desired data from the memory 801.

The present disclosure also provides a data access device for parallel FFT computation which may implement the above data access method. As shown in FIG. 3, the device includes the multi-granularity parallel memories 300 and 302, the multi-granularity parallel memory 303, and the butterfly computation module 301.

The multi-granularity parallel memories 300 and 302 form a ping-pong configuration to alternatively store the input or output data of a computation stage 401.

The multi-granularity parallel memory 303 is configured to store twiddle factors for the computation stage 401. The twiddle factors may be determined according to the above Formula 1.

The butterfly computation module 301 is configured to perform butterfly computation on to-be-processed data alternately acquired from the multi-granularity parallel memories 300 and 302 based on the twiddle factors stored in the multi-granularity parallel memory 303, and alternately store the computation results in the multi-granularity parallel memories 300 and 302.

Connection lines between the multi-granularity parallel memory 300 and the butterfly computation module 301 comprise data lines 306, an address line 310, and an access granularity indication line 309; connection lines between the multi-granularity parallel memory 302 and the butterfly computation module 301 comprise data lines 305, an address line 312, and an access granularity indication line 311; and connection lines between the multi-granularity parallel memory 303 and the butterfly computation module 301 comprise data lines 304, an address line 308, and an access granularity indication line 307.

It is assumed that a computation node reads data from the memory 300, and writes the result to the memory 302. According to the access method of FIG. 9, the R/W address and the R/W granularity for each memory block at the computation node are:
- address line 310: i×size of memory block +j×$2^B$
- access granularity indication line 309: $2^B$
- address line 312: i×N/$2^{2B}$+j
- access granularity indication line 311: 1
- address line 308: i×N/$2^B$+j×$2^B$
- access granularity indication line 307: $2^B$ The foregoing description of the embodiments illustrates the objects, solutions and advantages of the present disclosure. It will be appreciated that the foregoing description refers to specific embodiments of the present disclosure, and should not be construed as limiting the present disclosure. Any changes, substitutions, modifications and the like within the spirit and principle of the present disclosure shall fall into the scope of the present disclosure.

What is claimed is:

1. A data access method for parallel FFT computation comprising the steps of:
    dividing initial FFT data of a length N into $2^G$ groups by a parallel granularity $2^B$, where G=$\log_2$N−B, and storing the $2^G$ groups in respective memory rows of $2^B$ memory blocks in a first multi-granularity parallel memory or a second multi-granularity parallel memory, where each of the memory blocks comprises $2^{G-B}$ groups, and occupies $2^{G-B}$ memory rows;
    storing sequentially $2^B$−1 twiddle factors required for computation of each butterfly group in memory rows of a third multi-granularity parallel memory;
    reading data required for FFT butterfly computation stored in the jth memory row of the ith memory block in the first or the second multi-granularity parallel memory with a read granularity of $2^B$, where i and j each have an initial value of 0, and reading sequentially, from the third multi-granularity parallel memory, the twiddle factors required for FFT butterfly computation with a granularity of $2^B$ in the order of the memory rows;
    performing parallel butterfly computation on the data read from the jth memory row with a granularity of $2^B$ based on the read twiddle factors;
    writing the result data of butterfly computation to the first or the second multi-granularity parallel memory with a granularity of 1, where when the data was read from the first multi-granularity parallel memory, the result data is written to the second multi-granularity parallel memory, and vice versa;
    determining whether an index j of the current memory row satisfies j<$2^{G-B}$ and incrementing j by 1 and returning to the step of reading if it satisfies, otherwise setting j to 0; and
    determining whether an index i of the current memory block satisfies i<$2^B$, and incrementing i by 1 and returning to the step of reading if it satisfies, otherwise terminating the method.

2. The method of claim 1, wherein an address of the data read at the step of reading is determined by an index value i of the memory block and an index value j of the memory row, and an address for the jth memory row of the ith memory block is i×size of memory block+j×$2^B$.

3. The method of claim 1, wherein said reading the twiddle factors from the third multi-granularity parallel memory further comprises:
    obtaining a global index 1 for a memory row based on a index i of the memory block and an index j of the memory row from which the data required for FFT butterfly computation is read, wherein 1=(i<<G)+j;
    calculating a number g for a corresponding butterfly group based on the global index 1, wherein g=1 shifted leftward by kB bits, k being a index of a current computation node;
    calculating an exponent T for a twiddle factor required for the butterfly group based on the number g according to a butterfly representation; and
    calculating the twiddle factor $e^{-(j2\pi/N)T}$ for the butterfly group based on the exponent T for the twiddle factor.

4. The method of claim 3, wherein among the $2^G$ groups, each data point has an index value $g_{G-1} \ldots g_1 g_0 b_{B-1} \ldots b_1 b_0$ comprising two portions of a group index value $g=g_{G-1} \ldots g_1 g_0$, and an intra-group index value $b=b_{B-1} \ldots b_1 b_0$.

5. The method of claim 4, wherein the butterfly representation comprises two portions including a first portion used to represent bits of index values of two input data points for the butterfly computation, and a second portion used to represent bits of an exponent for a twiddle factor corresponding to the butterfly computation.

6. The method of claim 5, wherein the first portion comprises two parts including group index values and an intra-group index value, wherein the group index value is a lower section $g_{iB-1} \ldots g_1 g_0$ of the group index value $g=g_{G-1} \ldots g_1 g_0$, i is the index of the current computation node; the group index value is a higher section $g_{G-1} \ldots g_{iB}$ of the group index value excluding the lower section, and the intra-group index value is B bits of $b_{B-1} \ldots b_? b_{k-1} \ldots b_1 b_0$, wherein k is the index of the current computation stage, and $b_?$ is a bit which is different between the intra-group index values of two data points inputted to the butterfly computation.

7. The method of claim 6, wherein $b_?$ equal to 0 denotes the input data A of the butterfly computation, and $b_?$ equal to 1 denotes the input data B of the butterfly computation.

8. The method of claim 7, wherein the second portion is a binary representation of the exponent of the twiddle factor corresponding to the butterfly computation associated with the first portion.

9. The method of claim 1, wherein the butterfly computation at step 4 is an in situ operation, for a butterfly computation having input data A and B, and twiddle factor W, a index of one of the results A+BW in the output data is the same as the index of A in the input data, and the index of the other result A−BW in the output data is the same as the index of B in the input data.

10. The method of claim 1, wherein an address to which the data is written is a index of a memory row plus an increment, and for the jth memory row of the ith memory block, the incremented index is i×N/$2^{2B}$+j.

* * * * *